US012718394B2

(12) United States Patent
Karl et al.

(10) Patent No.: US 12,718,394 B2
(45) Date of Patent: Aug. 25, 2026

(54) APPARATUS AND METHOD FOR MEASURING, INSPECTING OR MACHINING OBJECTS

(71) Applicant: Carl Zeiss AG, Oberkochen (DE)

(72) Inventors: Matthias Karl, Königsbronn (DE); Trinh Nguyen Cong, Schwäbisch Gmünd (DE); Marc Forstenhäusler, Ulm (DE)

(73) Assignee: Carl Zeiss AG, Oberkochen (DE)

( * ) Notice: Subject to any disclaimer, the term of this patent is extended or adjusted under 35 U.S.C. 154(b) by 544 days.

(21) Appl. No.: 18/036,442

(22) PCT Filed: Nov. 9, 2021

(86) PCT No.: PCT/EP2021/081060
§ 371 (c)(1),
(2) Date: May 11, 2023

(87) PCT Pub. No.: WO2022/101178
PCT Pub. Date: May 19, 2022

(65) Prior Publication Data

US 2023/0419531 A1 Dec. 28, 2023

(30) Foreign Application Priority Data

Nov. 11, 2020 (DE) ......................... 102020129743.2

(51) Int. Cl.
*G06T 7/70* (2017.01)

(52) U.S. Cl.
CPC ...... *G06T 7/70* (2017.01); *G06T 2207/20081* (2013.01); *G06T 2207/20084* (2013.01)

(58) Field of Classification Search
CPC ............. G06T 7/70; G06T 2207/20081; G06T 2207/20084; G05B 2219/37288;
(Continued)

(56) References Cited

U.S. PATENT DOCUMENTS 11,579,097 B2 * 2/2023 Oetiker ................. G01S 17/894
2019/0291275 A1 9/2019 Szarski et al.
(Continued)

FOREIGN PATENT DOCUMENTS

DE 10235905 A1 9/2003
DE 10 2016 109 919 A1 11/2017
(Continued)

OTHER PUBLICATIONS

Imperoli, Marco, and Alberto Pretto. "D co: Fast and robust registration of 3d textureless objects using the directional chamfer distance." International conference on computer vision systems. Cham: Springer International Publishing, 2015. (Year: 2015).*
(Continued)

*Primary Examiner* — Bobbak Safaipour
(74) *Attorney, Agent, or Firm* — Renner, Otto, Boisselle & Sklar, LLP

(57) ABSTRACT

An apparatus for measuring, inspecting and/or processing objects is provided. The apparatus has a mobile platform for moving the apparatus through a region in space and a kinematic system attached to the mobile platform. An instrument head is fitted to the kinematic system. The apparatus furthermore comprises a controller configured to determine a first estimate of a pose of a target object on the basis of an image from a camera of the apparatus and a digital representation of the target object, to control the mobile platform on the basis of the first estimate, to move toward the target object, to determine a second estimate, in particular a more accurate estimate, of the pose of the target object on the basis of signals from at least one sensor of the apparatus and to control the kinematic system to position the instrument head on the target object on the basis of the second estimate.

20 Claims, 8 Drawing Sheets

(58) Field of Classification Search
CPC ........... G05B 2219/40298; G05B 2219/40607; G05B 2219/45066; B25J 9/162; B25J 9/1694; B25J 9/1697; G01B 5/0004; G01B 11/002; G01B 11/26; G01B 11/24
See application file for complete search history.

(56) References Cited

U.S. PATENT DOCUMENTS

| | | | | |
|---|---|---|---|---|
| 2019/0321977 | A1* | 10/2019 | Tan | B25J 9/162 |
| 2021/0039261 | A1* | 2/2021 | Ooba | B25J 13/08 |
| 2021/0157112 | A1* | 5/2021 | Raab | G02B 21/0012 |

FOREIGN PATENT DOCUMENTS

| | | | |
|---|---|---|---|
| DE | 112016002013 | T5 | 1/2018 |
| DE | 20 2017 001 227 | U1 | 6/2018 |
| DE | 10 2018 008 209 | A1 | 3/2019 |
| DE | 212018000178 | U1 | 11/2019 |
| DE | 102018124712 | B4 | 6/2021 |
| EP | 2679350 | A2 | 1/2014 |
| EP | 2869157 | A2 | 5/2015 |
| WO | WO2019/146201 | A1 | 8/2019 |

OTHER PUBLICATIONS

International Search Report from corresponding International Patent Application No. PCT/EP21/81060, dated Feb. 28, 2022.

H. Tjaden et al., "A Region-based Gauss-Newton Approach to Real-Time Monocular Multiple Object Tracking", IEEE transactions on pattern analysis and machine intelligence 41.8 (2018), pp. 1797-1812.

M. Imperoli and A. Pretto, "D2CO: Fast and Robust Registration of 3D Textureless Objects using the Directional Chamfer Distance", Proceedings of the 10th international conference on computer vision systems (ICVS), 2015, p. 316ff.

S. Peng et al., "PVNet: Pixel-wise Voting Network for 6DoF Pose Estimation", arXiv 1812.11788, Dec. 31, 2018.

C. Wang et al., "DenseFusion: 6D Object Pose Estimation by Iterative Dense Fusion", arXiv 1901.04780, Jan. 2019.

K. Kleeberger and M. Huber, "Single Shot 6D Object Pose Estimation", arXiv 2004.12729, Apr. 2020.

S. Thalhammer et al., "SyDPose: Object Detection and Pose Estimation in Cluttered Real-World Depth Images using only Synthetic Data", 2019 International Conference on 3D Vision.

H. Cai et al., "Fast Detection of Multiple Textureless 3-D Objects", Proceedings of the 9th International Conference on Computer Vision Systems (ICVS), 2013.

M.-Y. Liu et al., "Fast Object Localization and Pose Estimation in Heavy Clutter for Robotic Bin Picking", Mitsubishi Electric Research Laboratories TR2012-00, 2012.

B. Drost et al., "Model Globally, Match Locally: Efficient and Robust 3D Object Recognition", published at http://campar.in.tum.de/pub/drost2010CVPR/drost2010CVPR.pdf.

German Search Report dated Aug. 26, 2021 from related/corresponding German Patent Appl. No. 10 2020 129 743.2.

T. Hodan et al., "BOP: Benchmark of 6d object pose estimation", European Conference on Computer Vision (ECCV) 2018.

* cited by examiner

APPARATUS AND METHOD FOR MEASURING, INSPECTING OR MACHINING OBJECTS

RELATED APPLICATION DATA

This application claims priority of International Patent Application No. PCT/EP2021/081060, filed Nov. 9, 2021, which claims priority of German Patent Application No. DE 10 2020 129 743.2, filed Nov. 11, 2020, each of which is incorporated herein by reference in its entirety.

FIELD OF THE INVENTION

The present application relates to apparatuses and methods for measuring, inspecting or machining objects which are usable, in particular, in the industrial manufacture of objects such as, for example, motor vehicles, aircraft, components thereof, or for measuring industrial devices, without however being restricted thereto.

BACKGROUND OF THE INVENTION

Various apparatuses and methods for measuring and machining objects are known in industry. Such apparatuses and methods can be used for example for the final inspection of a produced product, for inspection during manufacture or for machining a product during manufacture.

Coordinate measuring machines are an example of such apparatuses. Such coordinate measuring machines usually comprise a measuring head system having a sensor for measuring the object or a positioning system, by means of which the measuring head can be moved along an object to be measured. Conventional coordinate measuring machines are stationary and require the coordinate measuring machine to be larger than the target object, which is also referred to as measurement object in this case. Moreover, the target object has to be brought to the coordinate measuring machine.

DE 10 2016 109 919 A1 discloses in this regard an apparatus for measuring objects in which a measuring head is attached to a measuring robot positioned on a mobile platform. In this way, the measuring robot can be brought to the object by means of the mobile platform and can then measure the object. In that case, various sensors are used for positioning the platform and the measuring robot.

Accurate positioning of the measuring head is necessary particularly if specific points of the object, e.g. only individual points, are to be measured. Rapid and accurately targeted positioning is also important here in order to achieve a sufficient throughput in industrial manufacture.

US 2019/0 291 275 A1 discloses a method for a robot with a mobile platform in which, on the basis of a CAD model of the object, a plurality of waypoints are calculated on the basis of a range of a robotic arm and a robot is moved accordingly. In that case, the robotic arm is arranged on a mobile platform and has various sensors. Corresponding waypoints thus have to be calculated here.

DE 10 2018 008 209 A1 discloses a further method for positioning a mobile robot in interaction with an assembly line that continues to move an object to be machined. So-called “virtual gap points” of a contour of the object are determined for this purpose.

Further apparatuses and methods for positioning robots with measuring heads are known from EP 2 869 157 A1 or US 2019/0 321 977 A1.

Similar problems also occur during the accurately targeted machining of objects. In this case, in addition or as an alternative to the measuring head, a corresponding machining tool is attached to the robotic arm. For the rest, the same statements as those given above with respect to measurement are applicable.

SUMMARY OF THE INVENTION

Proceeding from the known methods, a problem addressed by the present invention is that of providing improved apparatuses and methods which make possible more rapid and/or more accurate positioning of a robotic arm relative to an object.

An apparatus for measuring, inspecting and/or machining objects is provided, comprising a mobile platform for moving the apparatus through a spatial region, a kinematic system attached to the mobile platform, and an instrument head attached to the kinematic system. The kinematic system is configured to move the instrument head relative to the mobile platform.

Furthermore, the apparatus comprises at least one sensor. Finally, the apparatus comprises a controller configured to determine a first estimation of a pose of a target object on the basis of signals from the at least one sensor, to control the mobile platform on the basis of the first estimation to move to the object, to determine a second, more accurate (i.e. more accurate than the first estimation) estimation of the pose of the target object on the basis of signals from the at least one sensor, wherein determining the first estimation and/or determining the second estimation are/is additionally effected on the basis of a digital representation of the target object, and to control the kinematic system to position the instrument head at the target object on the basis of the second estimation.

Accurate positioning of the instrument head at the object can be achieved in this way. By way of example, the positioning accuracy can be in the range of 0.1 mm in some exemplary embodiments.

In this case, a mobile platform should be understood to mean a device by means of which the apparatus is movable. For this purpose, the mobile platform can comprise wheels with a drive, for example. In another exemplary embodiment, the mobile platform can be a rail-bound mobile platform which moves on rails through the spatial region.

In the context of this application, target object denotes an object on which measurements are to be carried out and/or which is intended to be machined.

A kinematic system should be understood to mean a movable device which can move the instrument head. One example of such a kinematic system is a robotic arm.

A pose should be understood to mean the combination of position and orientation, as defined for example in DIN ISO 8373, 2nd edition of 3 Dec. 2012, under 4.5. The pose can be specified for example in three translation coordinates, which specify the position of an object, and 3 angle coordinates, which specify the orientation.

A digital representation should be understood to mean data which specify the shape of the object. Such a digital representation can be for example a 3D model of the object created on the basis of measurements on a sample object, and/or CAD (“computer aided design”) data of the object. It should be noted that this digital representation need not correspond exactly to the object. In particular, the digital representation can represent a target shape of the object, and in some embodiments the apparatus can then be used to detect deviations from this target shape during a measurement (e.g. missing drilled holes or deformations). The digital representation can optionally include a texture of the object, which can then additionally be used for determining the estimation of the pose.

It should generally be noted that terms such as "an image" do not exclude further images or a video, i.e. a sequence of images, also being used for estimation purposes.

An instrument head generally comprises one or more sensors for measuring or inspecting the target object and/or one or more tools for machining the target object.

In this case, measuring is understood to mean in particular a quantitative measurement (e.g. measurement of a length), while inspecting can be qualitative, for example can check the presence of specific features, such as e.g. drilled holes, or can recognize defects such as cracks without quantitatively measuring them, or can carry out a completeness analysis. Such inspecting can be used in particular for quality assurance.

The at least one sensor whose signals are used for the first estimation can comprise for example a camera such as a wide-field camera. In this case, the signals from the sensor correspond to a recorded image. The at least one sensor can additionally or alternatively also comprise a LIDAR sensor, wherein in particular a LIDAR sensor is also usable in combination with a camera.

The controller can furthermore be configured to identify the target object in the image before determining the first estimation and to determine the first estimation on the basis of the identified object. LIDAR measurements can also be carried out on the basis of the identified object. Conventional methods for image recognition can be used for this purpose. Moreover, the digital representation can be used for identification purposes. The estimation of the pose can be facilitated by such an identification.

An overview of various methods for pose estimation which can be used here for the first estimation, for example, can be found in T. Hodah et al., "BOP: Benchmark of 6d object pose estimation", European Conference on Computer Vision (ECCV) 2018.

The controller can furthermore be configured to determine a distance between the target object and the apparatus on the basis of a measurement of the at least one sensor before determining the first estimation. For this purpose, the at least one sensor can comprise for example a LIDAR sensor, a radar sensor or some other sensor suitable for distance measurement, such as a time-of-flight sensor (TOF, "time of flight"). The distance determination can then influence the estimation of the pose since the size of the object as it appears in the image is then known for example from the dimensions of the object from the digital representation and the detection can thus be facilitated. Moreover, the movement of the mobile platform can be determined on the basis of the distance.

The controller is furthermore configured to track the pose of the target object, e.g. in accordance with the first estimation, during the movement of the mobile platform and/or during the movement of the kinematic system, although this feature can also be omitted in other embodiments. In other words, the pose can be constantly adapted during the movement in order thus to be able to correct the movement. This can be helpful in particular if the target object moves during the movement itself. In this case, region-based tracking can be used, in particular. Such region-based tracking is described for example in H. Tjaden et al., "A Region-based Gauss-Newton Approach to Real-Time Monocular Multiple Object Tracking", IEEE transactions on pattern analysis and machine intelligence 41.8 (2018), pages 1797-1812.

The controller can also comprise a trained machine learning logic for determining the first estimation and/or the second estimation. In this case, a machine learning logic should be understood to mean an apparatus, in particular a computing device, which has been trained by machine learning methods. Examples include trained neural networks such as CNNs ("convolutional neural networks"), neural networks having a multiplicity of layers, including hidden layers, or support vector machines. In order to train such a machine learning logic, images and digital representations of sample objects can be fed to the machine learning logic, wherein the pose of the object can then be provided by means of coordinates (three translation coordinates and three angles) or in some other way, for example by means of coordinates of corner points of a parallelepiped or other body circumscribing the object. These coordinates are then the result in the trained state if corresponding images and digital representations are fed to the trained machine learning logic. In this case, for training purposes, in particular views of objects from various directions can be taken into account, and a large number of images, for example approximately 10,000 images, can be used. In this regard, it is possible to recognize a pose of an object from different directions, in instances of concealment and/or under different lighting conditions.

Determining the second estimation can be effected on the basis of the image or a further image, for example an image of the target object recorded after the movement of the platform, the digital representation and the first estimation. The first estimation is thus used as a basis for the second estimation, which enables a step-by-step refinement of the determination of the pose. Here, too, tracking can additionally take place. Optimization methods such as, for example, a "Directional Chamfer" optimization such as Direct Directional Chamfer Optimization ($D^2CO$), for example, can be used for this purpose. In this way, an accurate determination of the pose is possible even in the case of comparatively complex objects. In this case, the $D^2CO$ method is suitable for example for lustrous surfaces as well. A description of the method is found for example in M. Imperoli and A. Pretto, "D2CO: Fast and Robust Registration of 3D Textureless Objects using the Directional Chamfer Distance" Proceedings of the 10th international conference on computer vision systems (ICVS), 2015, page 316ff. However, other algorithms can also be used. Such algorithms can be implemented for example in parallelized fashion on graphics processors.

Corresponding methods for controlling an apparatus for measuring and/or machining objects, comprising a mobile platform for moving the apparatus through a spatial region and a kinematic system attached to the mobile platform, with an instrument head attached to the kinematic system, and a sensor, are additionally provided. Such a method comprises a first estimation of a pose of a target object on the basis of signals from a sensor, controlling the mobile platform to move to the object, a second, more accurate estimation of the pose of the target object on the basis of signals from the at least one sensor, wherein determining the first estimation and/or determining the second estimation are/is additionally effected on the basis of a digital representation of the target object, and controlling the kinematic system on the basis of the second estimation in order to position the instrument head at the target object.

BRIEF DESCRIPTION OF THE DRAWINGS

The invention is explained in greater detail below with reference to the accompanying drawings, in which.

DETAILED DESCRIPTION OF THE INVENTION

Various exemplary embodiments are explained in detail below. These are only illustrative and should not be construed as limiting.

While exemplary embodiments are described with a large number of features, not all of these features (e.g. elements, components, method steps, processes, algorithms, etc.) are necessary for implementation, and other exemplary embodiments can contain alternative features or additional features, or some features can be omitted. By way of example, specific algorithms and methods for pose determination are presented, although other algorithms and methods can also be used in other exemplary embodiments.

Features of different exemplary embodiments can be combined with one another, unless indicated otherwise. Variations and modifications which are described for one of the exemplary embodiments are also applicable to other exemplary embodiments.

Figure 1:
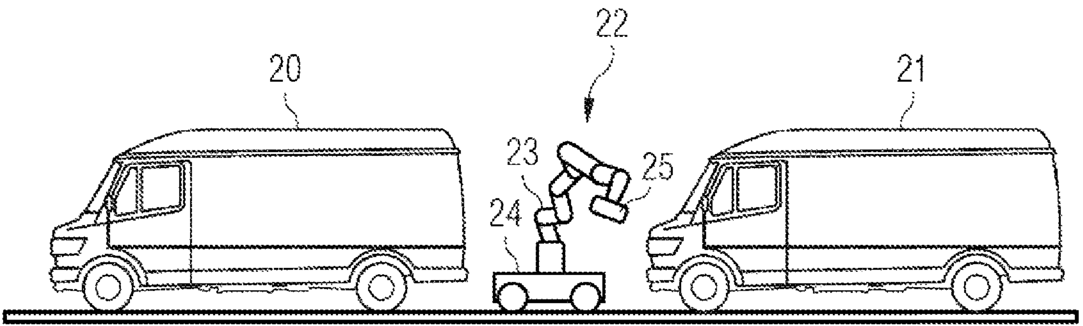
FIG. 1 shows an application example of an apparatus according to the invention.

FIG. 1 illustrates an exemplary embodiment of an apparatus 22 for measuring objects, for example motor vehicles 20, 21. The motor vehicles 20, 21 are merely one example of objects, and other kinds of objects, for example parts of motor vehicles, parts of other apparatuses or the like, can also serve as target object for the measuring and/or machining. Even though a measurement is used as an example here, a machining or an inspection of objects can also take place instead of the measurement or in addition thereto.

The apparatus 22 comprises a mobile platform 24 with wheels, caterpillar tracks or other options for locomotion and a drive such that the apparatus 22 can travel through one or more spaces, or else outdoors, to objects 22, 21 to be measured. The mobile platform 24 is one example of a mobile platform such as is usable in exemplary embodiments. As will also be explained later, this travel can be implemented autonomously by the apparatus 22 by means of a controller.

Furthermore, the apparatus 22 comprises a measuring head 25, which is attached to a kinematic system 23, for example a robotic arm. The kinematic system 23 allows the measuring head 25 to be positioned accurately at the object respectively to be measured (i.e. the respective target object), for example the motor vehicles 20 or 21. As will be explained below, for the purpose of controlling the apparatus 22, a pose of the object, i.e. the position and orientation thereof in space, is determined and the measuring head 25 is oriented accordingly, i.e. the pose of the measuring head relative to the object is defined as well. In this case, only the relative position of measuring head and object is ultimately what matters. Therefore, the following explanations of how the apparatus 22 is controlled in order to position the measuring head 25 at the object 20 or 21 should always be understood as positioning relative to the object. Such movement and positioning is also referred to as differential movement since it does not have to take place in an absolute, fixed coordinate system, rather actually just two objects, measuring head 25 and object 20 or 21, are positioned relative to one another.

The actual measurement is then carried out by means of the measuring head 25, also referred to as a sensor head. For this purpose, the measuring head 25 can comprise, for example, a confocal chromatic multi-spot sensor (CCMS), another type of optical sensor, a tactile sensor or any other suitable sensor that allows a desired measurement to be undertaken at the object to be measured. If a machining of the object is to be undertaken instead of a measurement, corresponding machining tools can be provided. Generally, in this regard, the measuring head 25 can be referred to as an instrument head comprising one or more sensors and/or one or more tools, for example for screwing, drilling, riveting, adhesive bonding, soldering or welding.

Instead of a robot, use can also be made of other kinematic systems, for example an autonomous horizontal-arm coordinate measuring machine. While the mobile platform is illustrated with wheels in this case, other solutions are also possible, such as, for example, a fixedly installed mobile platform which travels on rails. The latter is a possible procedure in particular if a region is well defined for example within a factory hall in which the measurements are intended to be carried out, such that a displacement on rails is likewise possible.

Figure 2:
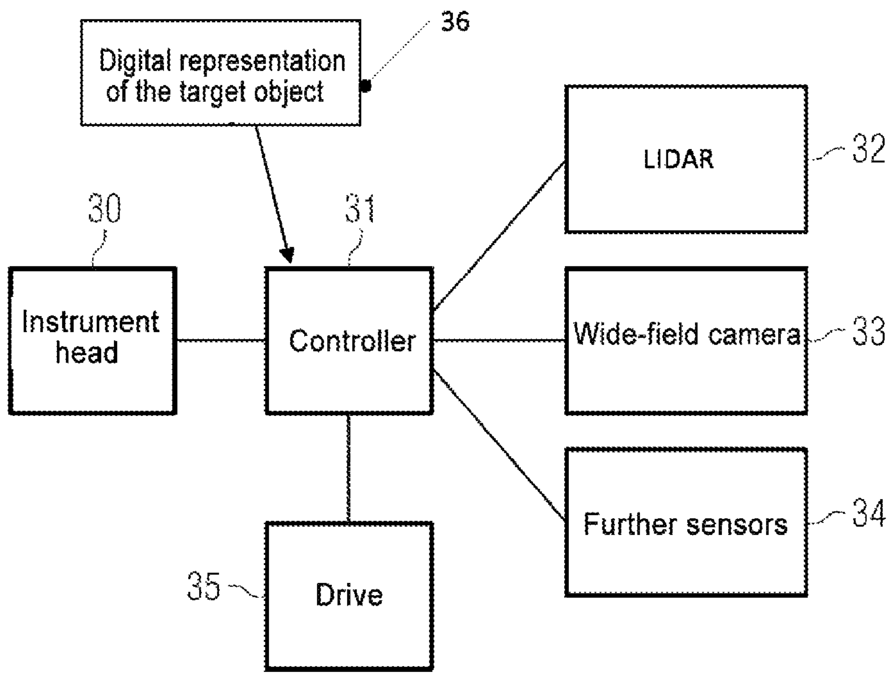
FIG. 2 shows a block diagram of an apparatus in accordance with one exemplary embodiment.

In order to explain this further, FIG. 2 shows a block diagram, on the basis of which an example of a structure of an apparatus, such as the apparatus 22, will be explained in greater detail. The functioning of the apparatus and methods for operating the apparatus will then be explained with reference to FIGS. 3 to 11. In the exemplary embodiment in FIG. 2, an apparatus for measuring objects comprises an instrument head 30, which, as explained for the measuring head 25, for example, comprises one or more sensors for measuring the target objects, and/or one or more tools for machining target objects. The measurement and/or machining is controlled by a controller 31. For this purpose, the controller 31 can have, for example, one or more microcontrollers, microprocessors and the like, which are programmed by an appropriate computer program to control the apparatus and to implement functions that will be explained in even greater detail below. An implementation wholly or partly by way of application-specific hardware is also possible. It should be noted that the controller 31 of the apparatus need not be implemented completely on the mobile platform 24. Rather, some of the control tasks, for example calculations, can also be implemented in an external computing device, such as a computer, and can be transferred to a controller component on the platform by way of a suitable interface, for example a radio interface.

Furthermore, the apparatus in FIG. 2 comprises a drive 35, which is used, for example, to move the mobile platform 24 from FIG. 1. Here, the drive 35 is controlled by the controller 31. For this control of the drive and the control of a kinematic system such as the kinematic system 22 from FIG. 1, the apparatus can have various sensors. A LIDAR sensor 32 ("light detection and ranging") and a wide-field camera 33, for example a fisheye camera or a wide-angle camera, are illustrated as an example. Moreover, further sensors 34, for example acceleration sensors, angle sensors, combinations thereof, e.g. so-called inertial measurement units (IMUs), magnetometers, a thermometer for temperature compensation, further cameras, for example a high-resolution camera having a smaller image angle than the wide-field camera 33, and the like, can be provided in the apparatus, for example at the kinematic system 23. A pattern-based projection camera, such as is used in gesture recognition systems, for example, can also be used as a further sensor. In other exemplary embodiments, the sensors can comprise a navigation system, for example a differential GPS ("global positioning system") or the like. Odometry data e.g. from wheels of the mobile platform can also be measured. The sensors 32-34 can have different update rates. Measurement data from different sensors can be used in combination with one another; conventional sensor fusion methods can be employed for this purpose.

The controller 31 additionally acquires a digital representation of the target object, for example of the objects 20, 21 from FIG. 1 or of parts thereof to be processed. On the basis of the digital representation 36 of the target object and data from the sensors 32 to 34, the controller 31 controls the drive 35 and the kinematic system 23 in order to position the measuring head 25 or the instrument head 30 at the target object, for example the objects 20, 21 from FIG. 1.

Various methods and techniques for this, which can be implemented in the controller 31, will now be explained with reference to FIGS. 3 to 11.

Figure 3:
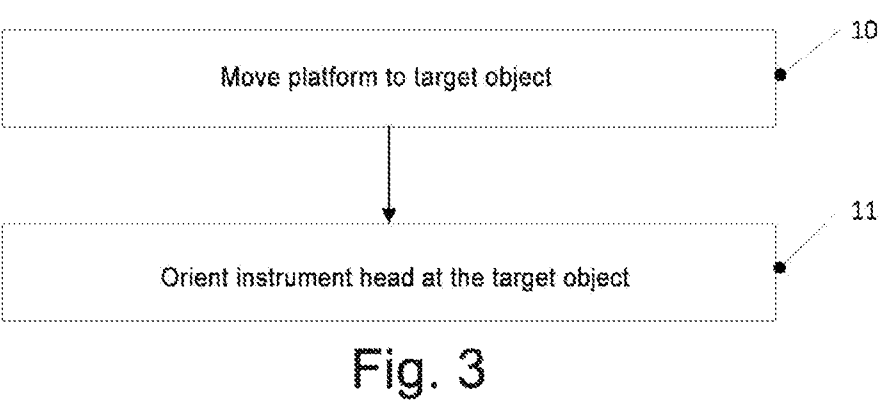
FIG. 3 shows a flowchart of a method in accordance with one exemplary embodiment.

FIG. 3 shows roughly a sequence of methods in accordance with various exemplary embodiments.

In step 10, the platform is moved to the target object, i.e. the object which is to be machined and/or to be measured. As explained later, this can be effected on the basis of a first, coarser, estimation of the pose of the object. In step 11, an instrument head, such as the instrument head 30 from FIG. 2, is then oriented at the target object. As will be explained in greater detail later, this can be effected on the basis of a more accurate estimation of the pose of the object. Hereinafter, the target object will also be referred to simply as object for short.

Next, a more detailed method sequence will be explained with reference to FIG. 4.

In step 40, the object is detected, and the distance to the object is determined. This can be done using an image recording, for example by means of the wide-field camera 33 from FIG. 3, and, in particular for the distance measurement, the LIDAR sensor 32 from FIG. 2. Machine learning techniques such as YOLO ("you only look once") methods or R-CNN, Fast R-CNN and Faster R-CNN methods can be used for object detection purposes. Such procedures make it possible to ascertain the presence of the target object and to ascertain the position thereof with an accuracy for example in the range of 100 mm, depending on object type and object size. These and other numerical values given here are only illustrative in this case and should not be construed as limiting.

In step 41, the pose of the object is then estimated, which is also referred to hereinafter as coarse estimation in order to distinguish it from the fine estimation effected later in step 43. In this case, the term "estimation" or "estimate" expresses the fact that the determination exhibits a degree of uncertainty, which is greater in the case of the coarse estimation in step 41 than later in the case of the fine estimation in step 43. A camera image can once again be used for this purpose, wherein the camera can be attached both to the mobile platform and to the instrument head. The camera can be the same camera as in step 40, or for this purpose a separate camera can be used, which for example has a smaller image angle and is oriented toward the object which was detected in step 40. Moreover, the digital representation of the object is used here, from which the shape of the object is evident. In some exemplary embodiments, a segmentation of the object is additionally effected here, in the case of which for example the contour of the object is determined in the image. The estimation of the pose and also the segmentation, if applied, can in turn be effected by means of machine learning techniques, for example by means of a so-called Single Shot Approach, PVNet or Dense Fusion method. Such methods are described for example in S. Peng et al., "PVNet: Pixel-wise Voting Network for 6DoF Pose Estimation", arXiv 1812.11788, December 2018, C. Wang et al., "DenseFusion: 6D Object Pose Estimation by Iterative Dense Fusion", arXiv 1901.04780, January 2019, or K. Kleeberger and M. Huber, "Single Shot 6D Object Pose Estimation", arXiv 2004.12729, April 2020.

Such methods allow the pose of the object to be determined with an accuracy in the range of ±10 mm to ±50 mm for object diameters of approximately 1 m. The achievable accuracy may depend on the object size in this case.

The pose thus determined can be tracked, in particular tracked in real time, in order to be able to take account of changes in the pose of the object. Region-based object tracking can be used here, which uses local color histograms of image recordings, for example, which are evaluated over time, and are optimized for the purpose of tracking the pose by means of a Gauss-Newton method. An update rate of the tracking can be adapted to a speed of movement of the mobile platform relative to the target object. The method mentioned allows up to approximately 20 recalculations per second and thus allows the tracking of fast movements. In this case, the update rate can be chosen in particular such that an excessively large change in the position of the object does not take place between successive images, i.e. the change in position is only of a magnitude such that the method can ensure reliable tracking.

In step 42, the platform is then moved to the object. For this purpose, LIDAR data from the LIDAR sensor 32 from FIG. 2 can be used besides the coarse estimation of the pose from step 41. The LIDAR data can be processed using SLAM techniques ("simultaneous localization and mapping") in order to enable a differential movement toward the object, with obstacles being able to be avoided. Robot Operating System (ROS) programs such as ROS Navigation Stack or ROS Differential_Drive can be used for this purpose. Using such techniques, in some exemplary embodiments, the platform can be positioned with a positioning accuracy of ±10 mm with respect to the object in a movement plane of the platform.

In step 43, the already mentioned fine estimation of the pose of the object is then effected. This can proceed from the coarse estimation from step 41 and further refine the latter. Sensor data, such as camera data, can again be used for this purpose. In this case, a high-resolution camera is preferably used, which can be provided for example in the instrument head 30 from FIG. 3. Moreover, the digital representation of the object can once again influence the calculation. Methods such as methods based on edge detection can be used in step 43. One example thereof is the $D^2CO$ method ("direct directional chamfer optimization"), which can yield robust results even with textureless and lustrous object surfaces.

In step 44, on the basis of the pose of the object estimated in step 43, the instrument head is then oriented at the object by control of a kinematic system such as the kinematic system 23. As a result, an accuracy of the pose determination of up to ±0.1 mm is possible in some exemplary embodiments. A positioning accuracy can then likewise be in this range if a kinematic system used at least likewise allows such an accuracy.

In step 45, the measurement and/or machining of the object are/is then carried out by means of the positioned instrument head and the sensors and/or tools situated thereon. By way of example, interspaces in an object can be measured, and/or it is possible to detect whether different parts of the object are oriented with level alignment.

One example of the coarse estimation in step 41 and possible tracking of the pose will now be explained with reference to FIGS. 5, 6, 7A and 7B.

Figure 5:
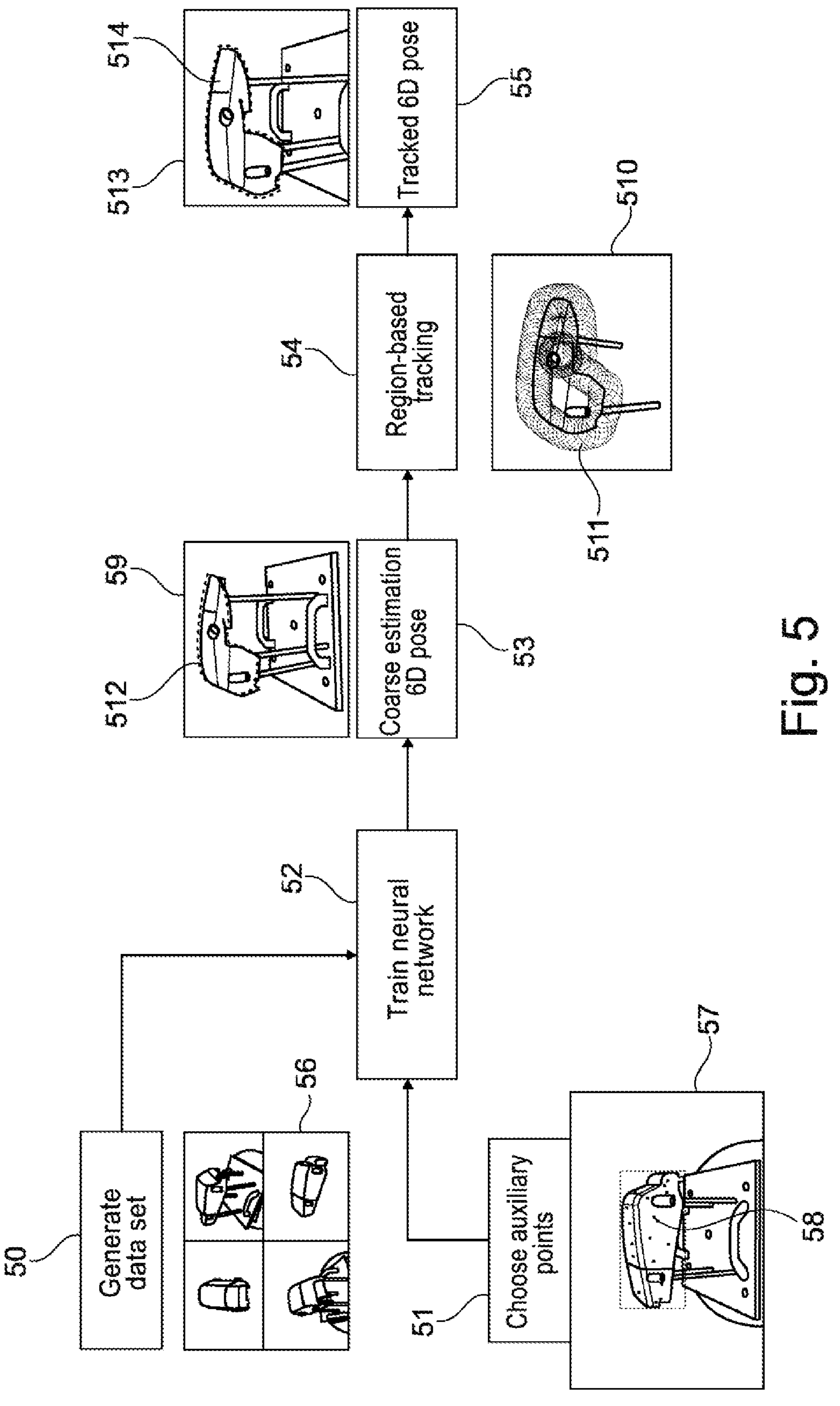
FIG. 5 shows a flowchart of a method in accordance with a further exemplary embodiment together with explanatory figures.

In step 50 in FIG. 5, a multiplicity of image recordings of an object from various directions is generated, as symbolized by images 56. This multiplicity of image data from various directions can be regarded as a digital representation of the object. In other embodiments, such images can be generated virtually from an existing digital representation, e.g. from 3D CAD data. Such a procedure is described for example in S. Thalhammer et al., "SyDPose: Object Detection and Pose Estimation in Cluttered Real-World Depth Images using only Synthetic Data", 2019 International Conference on 3D Vision. In this case, the recorded object in the images 56 is a specimen of an object to be measured later in production, for example a prototype or an object from series production. For each of the images, the pose of the object relative to a viewer position (the camera position in the case of real images, and a virtual observer position in the case of virtual generation) is provided. In the case of virtual generation, this information can likewise be generated concomitantly.

Step 51 involves automatically generating auxiliary points in the images generated in step 50, which identify the pose of the object in particular for the method described here. In an image 57 these can be as an example a multiplicity of 2D points 58 in the respective image of the object, which characterize a pose of the object. These auxiliary points can be for example corner points and center point of a bounding box (represented as a rectangle in image 57) circumscribing the object in the image, or points on the surface of the object, for example on edges, which can be recognized in the image by means of image recognition. These auxiliary points characterize the pose of the object for the method.

Figures 6, 7A, 7B:
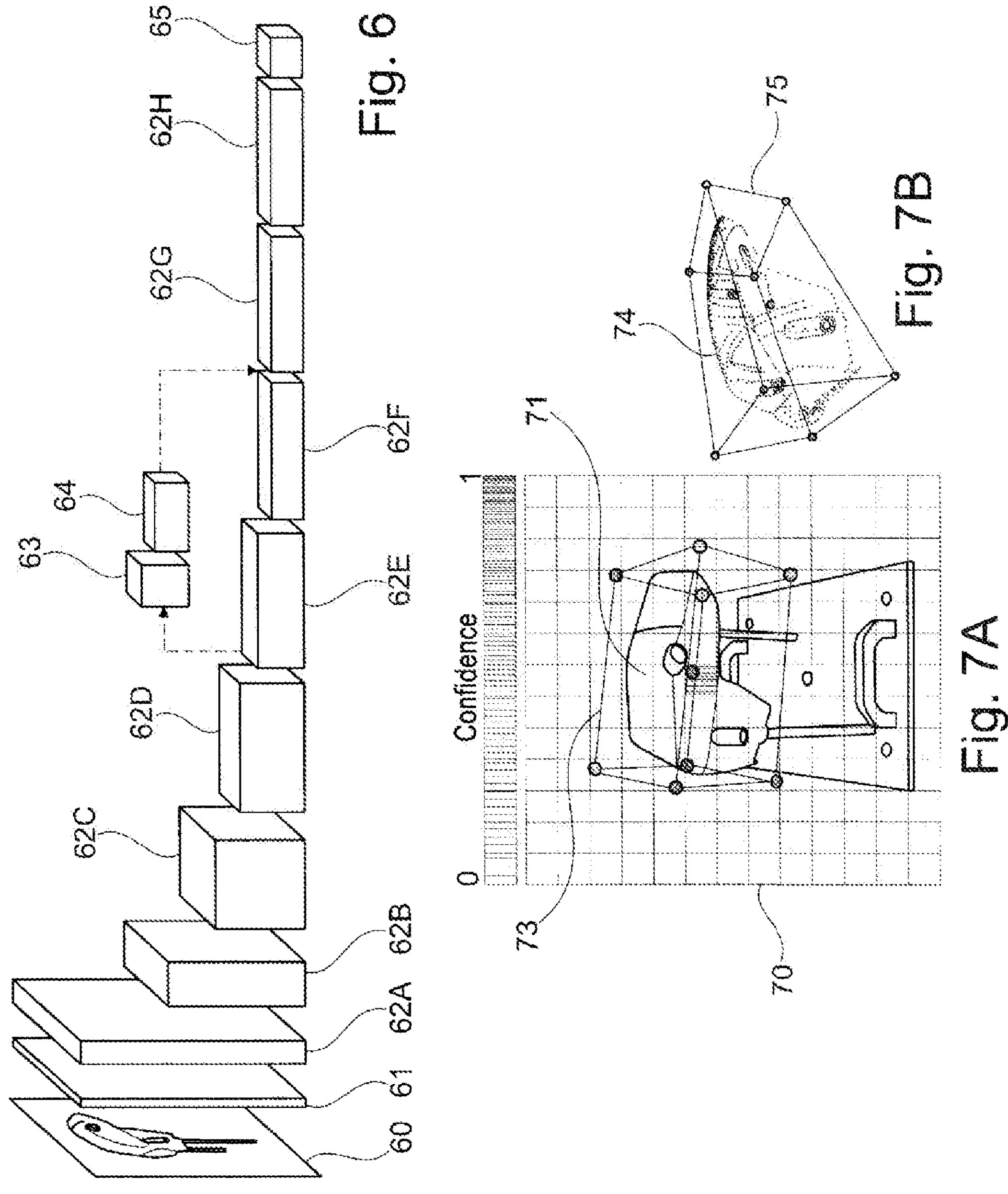
FIG. 6 shows a neural network such as can be used in some exemplary embodiments.
FIGS. 7A and 7B show views for explaining the functioning of the neural network from FIG. 6.

On the basis of these data, then in step 52 a neural network can firstly be trained and, after training, can then be used for determining the pose. In this case, for example, the poses of the images generated in step 50 are correlated with the auxiliary points from step 51, such that, after training, the corresponding auxiliary points and thus the pose can then be ascertained for essentially any images of the object. Such a neural network is illustrated as an example in FIG. 6. The neural network acquires as input an image 60 in an input layer 61. By way of example, the auxiliary points describing the object (see the explanations concerning image 57 and step 51) are then output from an output layer 65. The processing is effected by way of a multiplicity of intermediate layers 62A to 62H, wherein branchings, see layers 63, 64, can also occur. These layers 62A to 62H, 63, 64 are referred to as hidden layers of the neural network. In this case, the dimensionality of the problem can be changed in the layers. The neural network illustrated can be designed as a CNN ("convolutional neural network") and can operate according to the YOLO method, for example. The result obtained, as shown in FIGS. 7A and 7B, is a 3D bounding box represented around the object 71 as a parallelepiped 73 in the image 70 with the estimated corner points of the parallelepiped 73, which represents the pose of the object. For elucidation purposes, the 3D position is projected back onto the 2D image.

FIGS. 7A and B thus show one example of an output of the trained network. In this case, in FIG. 7A the 2D points in the image are visualized which have the corresponding 3D representation in accordance with FIG. 7B—here in accordance with an example in which the auxiliary points are defined such that they reflect the corner points of the 3D bounding box according to the parallelepiped 73.

From a recorded image such as the image 59 in FIG. 5, a coarse estimation of the pose in the six coordinates (6D), i.e. three translation coordinates and three angle coordinates, then arises in step 53 by means of the trained neural network to which the image is fed. As shown schematically as an example, the estimated pose, as symbolized by a green line 512, already approximates the actual pose of the object relatively well, but does indeed still exhibit errors.

As already explained, region-based tracking of the pose can then ensue in step 41. For this purpose, as indicated by circles 511 in an image 510, it is possible to draw up regions around the contour of the pose of the object and to differentiate foreground and background here. This is explained in greater detail in FIG. 8.

Figure 8:
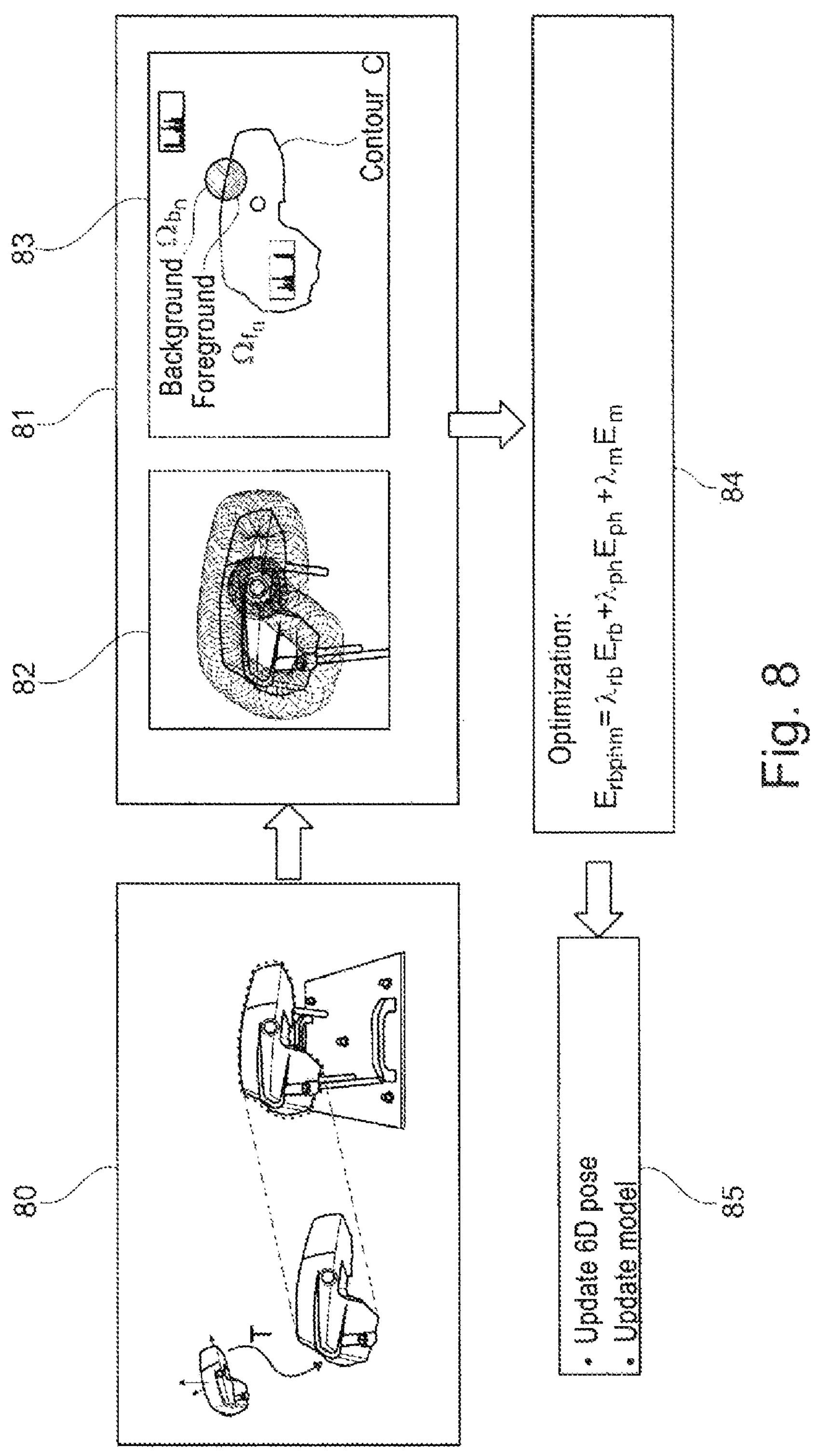
FIG. 8 shows a diagram for elucidating the tracking of a pose.

A block 80 in FIG. 8 symbolizes the coarse estimation of the pose, where for example the digital representation is adapted to the image by a transformation T and the transformation T (translation and rotation) thus represents the estimated pose. In a block 81, regions are then evaluated. In this case, the image 82 corresponds to the image 510 in FIG. 5, the individual circles representing individual regions. As indicated in an image 83, for the individual circles it is then possible to create histograms in the transition region of foreground and background and thus to better determine the contour of the object. This can be done by means of an optimization as expressed in a block 84. Here a function $E_{rbphm}$ consisting of three components is specified as a cost function to be optimized. In this case, $E_{rb}$ represents a cost function of a region-based pose recognition as illustrated in block 81, with a weighting factor $\lambda_{rb}$, $E_{ph}$ represents a cost function of a photometric pose recognition with a weighting factor $\lambda_{ph}$, and $E_m$ represents a cost function of a movement component, with a weighting factor $\lambda_m$. The weighting factors are adjusted in order to weight the cost functions relative to one another.

The photometric pose recognition is based on the assumption that the colors of any surface point of the object in each image are similar independently of the perspective (this is referred to as photometric consistency). The cost function represents the pixelwise photometric error as a function of the pose parameters (translation and orientation) which are optimized.

The movement component represents information about the movement of a camera used for image recording, for example on the basis of sensors such as inertial sensors (IMU, inertial measurement unit) or other movement sensors of the apparatus, for example of the mobile platform or of the kinematic system.

An updated 6D pose results therefrom in a block 85. Moreover, the digital representation, referred to here as model, can also be updated.

Referring to FIG. 5 again, in step 55 this results in a tracked 6D pose, as shown in an image 513. Even if the object has moved relative to the image recording compared with the image 512, the pose, represented here by a contour 514, corresponds even better to the object than in image 59.

Figure 4:
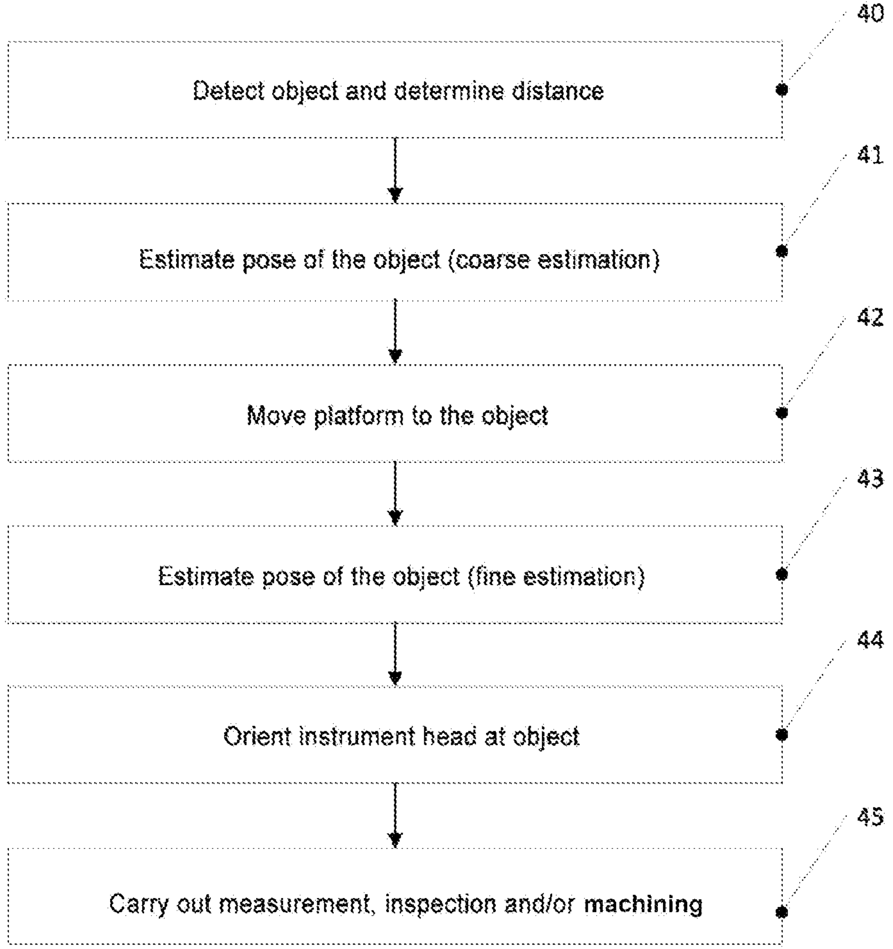
FIG. 4 shows a flowchart of a method in accordance with a further exemplary embodiment.
Figure 9:
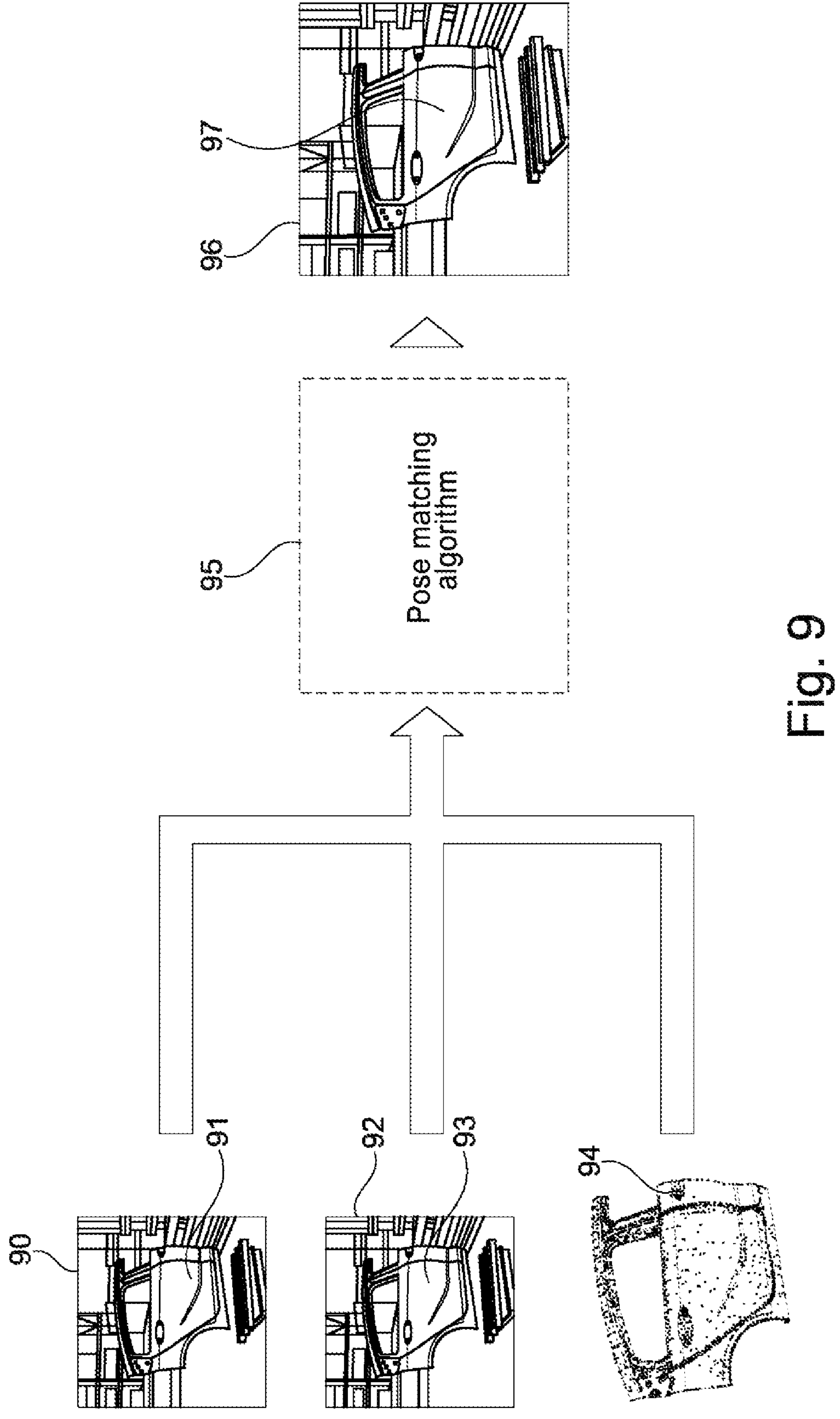
FIG. 9 shows a diagram for elucidating a method for more accurately estimating a pose.

Procedures for the fine estimation in step 43 in FIG. 4 are explained in greater detail next. FIG. 9 shows one procedure for the fine estimation in accordance with one exemplary embodiment.

A high-resolution input image 90, in which a target object 91, in this case an automobile door, can be seen, is used here as input. This input image 90 is recorded by a camera of the apparatus. Furthermore, the coarse estimation of the pose, represented here by a contour 93, which was obtained in step 41, is used as input information, as illustrated in an image 92. Finally, a digital representation 94 is used. These items of input information are fed to a pose matching algorithm 95, examples of which will be explained in greater detail later. What then results therefrom, as illustrated in an image 96, is the fine estimation of the pose, represented here by a contour 97.

Figure 10:
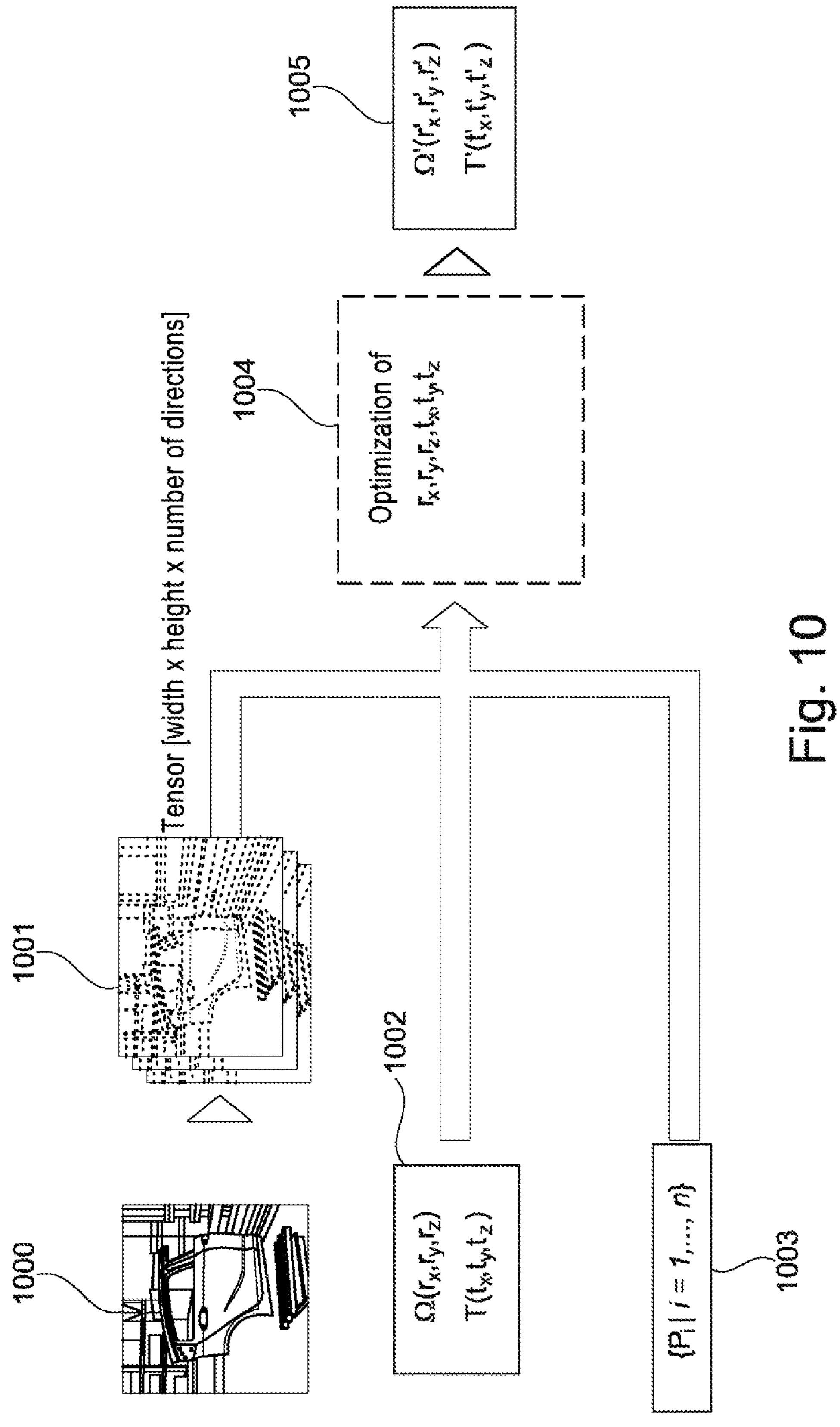
FIG. 10 shows a more detailed implementation example of the method from FIG. 9.

FIG. 10 shows one possibility for the implementation of the procedure from FIG. 9 by means of the $D^2CO$ method already mentioned. A high-resolution input image is processed by means of edge analysis in various directions to form a direction-dependent edge distance tensor (referred to as "directional chamfer distance tensor"), represented by image 1001, which tensor is a three-dimensional tensor having dimensions of width times height of the image times the number of evaluated directions. This tensor, the initial pose specified by a translation vector T with components $t_x$, $t_y$ and $t_z$ and an orientation vector Ω with orientation coordinates $r_x$, $r_y$, $r_z$ and a model of the object 1003, which is provided as a cloud of n 3D points $P_i$, for example, are fed to an optimization method 1004, which optimises the vector components of the pose, i.e. $r_x$, $r_y$, $r_z$, $t_x$, $t_y$, $t_z$. In the case illustrated in FIG. 10, the so-called "Powell's dog leg" method is used as optimization method.

Alternatively, some other method, for example the Levenberg-Marquardt method, can also be used. The result then produced is a refined pose 1005 with correspondingly refined vectors T and Ω, which are each identified by an apostrophe (') for differentiation from the initial pose 1002.

Figure 11:
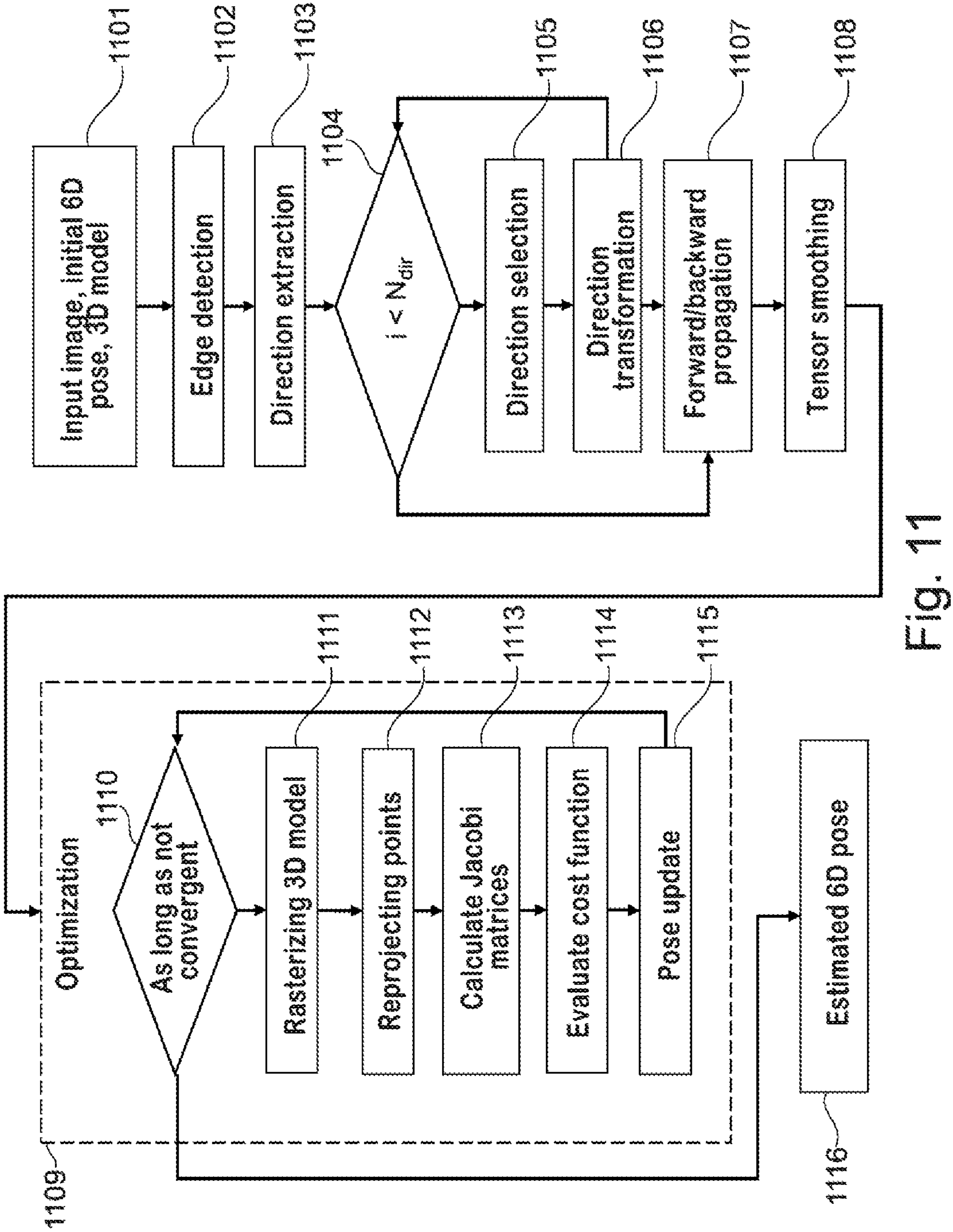
FIG. 11 shows a flowchart of a method for more accurately determining a pose in accordance with one exemplary embodiment.

FIG. 11 shows in this respect a flowchart of the application of the $D^2CO$ method, as also illustrated in FIG. 10, to the fine estimation of the pose of the object. Step 1101 involves providing as input values a high-resolution input image, an initial pose from the coarse estimation and a digital representation, for example a 3D model, as has already been explained in FIGS. 9 and 10. The tensor 1001 from FIG. 10 is then determined. In step 1102, edges in the input image are detected for this purpose. Conventional edge detection methods can be used for this purpose.

In step 1103, direction extraction is then effected, that is to say that various directions in which the model extends are recognized.

A loop 1104 proceeding over all directions is then effected, where $N_{dir}$ is the number of directions extracted in step 1103. For each pass, in step 1105, one of the directions is selected using a Harris transformation. A direction transformation then follows in step 1106. This involves a Euclidean 2D direction transformation for each combination of direction and detected edges, also referred to as a direction-edge map. The maps are then stacked to form a directional chamfer direction (DCD) tensor as represented in image 1001.

That is followed by a forward/backward propagation in step 1107. That involves calculating the DCD tensor on the basis of the 2D transformations from step 1106 and the directions of the detected edges. At the end, in step 1108, the tensor is smoothed according to its orientation, which can be done using a simple Gaussian filter. This tensor is then fed to a nonlinear optimization method 1109, corresponding to the optimization 1004 in FIG. 10. The latter, as already mentioned, proceeds according to the "Powell's dog leg" method or according to some other method such as the Levenberg-Marquardt method.

The optimization includes an optimization loop 1110 as long as the pose is not sufficiently convergent (for example as long as the components of the vectors T and Ω still change by more than a predefined magnitude or a predefined relative size per pass). In each pass of the loop, the digital representation, for example 3D model, is rasterized in step 1111. In this case, n example points are extracted.

In step 112, the points of the 3D model are reprojected, for which purpose the example points selected in step 1111 are projected onto edges in the 2D image space using the instantaneous pose T, Ω and calibration data of a camera used, and their directions are calculated. Step 1113 involves calculating Jacobi matrices with respect to T and Ω. In step 1114, a corresponding cost function is then evaluated, on the basis of which the pose is updated in step 1115. The fine estimation of the pose is then obtained as the result in step 1116.

Since the $D^2CO$ method is incidentally a method known per se, the above explanation has been kept comparatively short. As already mentioned, other methods can also be used, or the $D^2CO$ method can be combined with other methods, e.g. weighting of edges or so-called annealing (randomised delta transformations) or systematic offsets, which can increase the robustness. Other methods include Oriented Chamfer Matching as described in H. Kai et al., "Fast Detection of Multiple Textureless 3-D Objects", Proceedings of the 9th International Conference on Computer Vision Systems (ICVS), 2013, Fast Directional Chamfer matching as described in M.-Y. Liu et al., "Fast Object Localization and PoseEstimation in Heavy Clutter for Robotic BinPicking", Mitsubishi Electric Research Laboratories TR2012-00, 2012, or Point-Pair-Features Matching. The last-mentioned approach consists in extracting 3D feature points from depth images according to a certain strategy or according to the random principle. These observed feature points are adapted to the digital representation of the object (visible surface of the CAD model) according to an efficient method; in this case, hash tables for the assignment of point pairs can be used for accelerated calculation in regard to the run time. In addition, this approach uses various ICP algorithms for pose registration (Iterative Closest Point) such as "Picky-ICP" or "BC-ICP" (biunique correspondence ICP). One such method is described in B. Drost et al., "Model Globally, Match Locally: Efficient and Robust 3D Object Recognition", published at http://cannpar.in.tum.de/pub/drost2010CVPR/drost2010CVPR.pdf.

It is pointed out once again that the above exemplary embodiments, in particular preliminary details of methods used, are merely illustrative and other methods can also be used.

What is claimed is:

1. An apparatus for measuring, inspecting and/or machining objects, comprising:

a mobile platform for moving the apparatus through a spatial region, a kinematic system attached to the mobile platform, and an instrument head attached to the kinematic system, wherein the kinematic system is configured to move the instrument head relative to the mobile platform, at least one sensor attached to the mobile platform or the kinematic system, a high-resolution camera attached to the mobile platform or the kinematic system, and a controller configured:

to determine a first estimation of a pose of a target object on the basis of signals from the at least one sensor, to control the mobile platform on the basis of the first estimation to move to the target object, the first estimation having a first precision, to determine a second estimation of the pose of the target object on the basis of signals from the high-resolution camera and the first estimation and to control the kinematic system, the second estimation having a second precision greater than the first precision, wherein determining the first estimation and/or determining the second estimation are/is additionally effected on the basis of a digital representation of the target object, and to position the instrument head at the target object on the basis of the second estimation, and wherein the controller is further configured to track the pose of the target object during the movement of the mobile platform and/or during a movement of the kinematic system.

2. The apparatus as claimed in claim 1, wherein the controller is configured to identify the target object in the image before determining the first estimation and to determine the first estimation on the basis of the identified target object.

3. The apparatus as claimed in claim 1, wherein the controller is configured to determine a distance between the target object and the apparatus on the basis of a measurement of the at least one sensor before determining the first estimation.

4. The apparatus as claimed in claim 1, wherein the at least one sensor comprises a LIDAR sensor and/or a camera.

5. The apparatus as claimed in claim 1, wherein the controller is configured to track the pose by means of region-based tracking.

6. The apparatus as claimed in claim 1, wherein the controller comprises a trained machine learning logic for determining the first estimation and/or the second estimation.

7. The apparatus as claimed in claim 1, wherein determining the second estimation is effected on the basis of the image or a further image of the target object, the digital representation and the first estimation.

8. The apparatus as claimed in claim 7, wherein determining the second estimation is effected on the basis of an optimization method.

9. The apparatus as claimed in claim 8, wherein the optimization method comprises a directional chamfer optimization.

10. A method for controlling an apparatus for measuring, inspecting and/or machining objects, wherein the apparatus comprises a mobile platform for moving the apparatus through a spatial region, a kinematic system attached to the mobile platform, and an instrument head attached to the kinematic system, wherein the kinematic system is configured to move the instrument head relative to the mobile platform, and wherein the apparatus comprises at least one sensor attached to the mobile platform or the kinematic system and a high-resolution camera attached to the mobile platform or the kinematic system, wherein the method comprises:

determining a first estimation of a pose of a target object on the basis of signals from the at least one sensor, the first estimation having a first precision, controlling the mobile platform on the basis of the first estimation to move to the target object, determining a second estimation of the pose of the target object on the basis of signals from the high-resolution camera and the first estimation, the second estimation having a second precision greater than the first precision, wherein determining the first estimation and/or determining the second estimation are/is additionally effected on the basis of a digital representation of the target object, and controlling the kinematic system in order to position the instrument head at the target object on the basis of the second estimation, and tracking the pose of the target object during the movement of the mobile platform and/or during a movement of the kinematic system.

11. The method as claimed in claim 10, further comprising, before determining the first estimation, identifying the target object in the image, wherein the first estimation is determined on the basis of the identified target object.

12. The method as claimed in claim 10, further comprising, before determining the first estimation, determining a distance between the target object and the apparatus on the basis of a measurement of the at least one sensor.

13. The method as claimed in claim 10, wherein the tracking comprises region-based tracking.

14. The method as claimed in claim 10, wherein determining the first estimation comprises using a machine learning logic.

15. The method as claimed in claim 10, wherein determining the second estimation is effected on the basis of the image or a further image of the target object, the digital representation and the first estimation.

16. The method as claimed in claim 15, wherein determining the second estimation is effected on the basis of an optimization method.

17. The method as claimed in claim 16, wherein the optimization method comprises a directional chamfer optimization.

18. An apparatus for measuring, inspecting and/or machining objects, comprising:

a mobile platform for moving the apparatus through a spatial region, a kinematic system attached to the mobile platform, and an instrument head attached to the kinematic system, wherein the kinematic system is configured to move the instrument head relative to the mobile platform, at least one sensor, and a controller configured:

to determine a first estimation of a pose of a target object on the basis of signals from the at least one sensor, the first estimation having a first precision, to control the mobile platform on the basis of the first estimation to move to the target object, to determine a second estimation of the pose of the target object on the basis of signals from the at least one sensor and to control the kinematic system, the second estimation having a second precision greater than the first precision, wherein determining the first estimation and/or determining the second estimation are/is additionally effected on the basis of a digital representation of the target object without using artificial markers, and to position the instrument head at the target object on the basis of the second estimation, wherein the controller is further configured to track the pose of the target object during the movement of the mobile platform and/or during a movement of the kinematic system.

19. The apparatus as claimed in claim 18, wherein determining at least one of the first estimation or the second estimation is additionally effected on the basis of a digital representation of the target object using automatically generated auxiliary points in the images for pose identification.

20. The apparatus as claimed in claim 18, wherein the controller is further configured to perform region-based tracking of the pose of the target object during at least one of i) the movement of the mobile platform or ii) a movement of the kinematic system, the region-based tracking evaluating over time local color histograms of image recordings to track the pose of the target object.

* * * * *